Aug. 29, 1944.   H. BRADY   2,357,165
TRIPOD BASE
Filed Feb. 9, 1944   2 Sheets-Sheet 1

INVENTOR.
Henry Brady
BY
Victor J. Evans & Co.
ATTORNEYS

Aug. 29, 1944.　　　　H. BRADY　　　　2,357,165
TRIPOD BASE
Filed Feb. 9, 1944　　　　2 Sheets-Sheet 2

INVENTOR.
Henry Brady
BY
Victor J. Evans & Co.
ATTORNEYS

Patented Aug. 29, 1944

2,357,165

UNITED STATES PATENT OFFICE 2,357,165

TRIPOD BASE

Henry Brady, Beckley, W. Va.

Application February 9, 1944, Serial No. 521,677

3 Claims. (Cl. 248—194)

The invention relates to a roller-caster truck, and more especially to a maneuvering base for tripods, lamp stands or other like supports.

The primary object of the invention is the provision of a device of this character, wherein a tripod for camera support, photograph light equipment, field engineering instruments or other like supports when set up thereon can be readily and easily moved from one locality or another, without disturbance to such support in its adjustment, and with no liability of the said support falling or toppling over.

Another object of the invention is the provision of a device of this character, wherein the same is of a construction so as to permit it being moved in congested places, and will maintain a vertical center to the support when carried by the said device, the latter being readily knocked down and folded when not in use to occupy the least possible space in the storing thereof.

A further object of the invention is the provision of a device of this character, wherein in the use thereof it enables the camera man or field engineer to obtain with dispatch the best possible camera or instrument position, as well as to permit a photograph lamp to be easily and quickly maneuvered into proper working position, the said device being applicable to either studio or field service.

A still further object of the invention is the provision of a device of this character, wherein the tripod or support when set up can be moved bodily in this condition to any desired position, without derangement thereof.

A still further object of the invention is the provision of a device of this character, which is simple in construction, readily and easily brought in use, strong, durable, thoroughly reliable and efficient in operation, and inexpensive to manufacture.

With these and other objects in view the invention consists in the features of construction, combination and arrangement of parts as will be hereinafter more fully described, illustrated in the accompanying drawings, which show the preferred embodiment of the invention and hereinafter pointed out in the claims hereunto appended.

In the accompanying drawings.

Similar reference characters indicate corresponding parts throughout the several views in the drawings.

Figure 1:
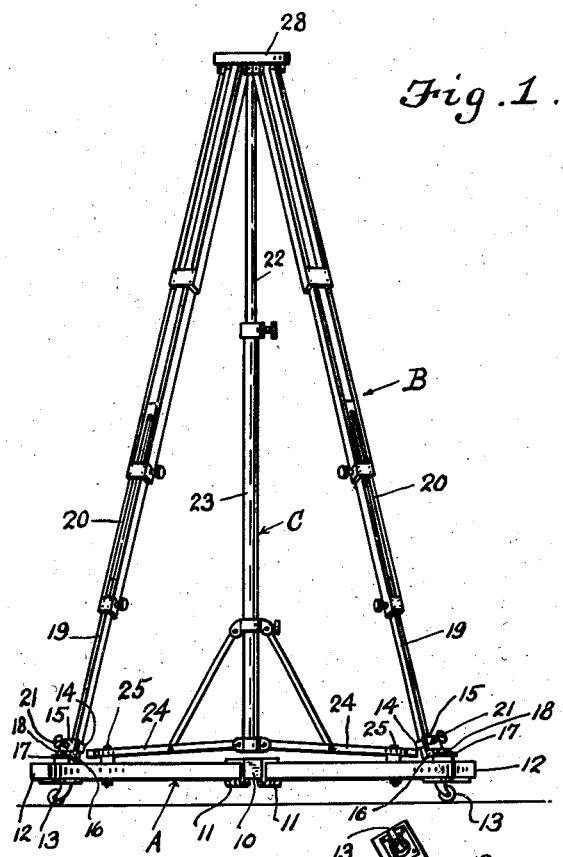
Figure 1 is an elevation of the device constructed in accordance with the invention, showing a tripod and center upright of the usual well known constructions mounted thereon for service.
Figure 6:
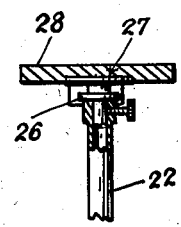
Figure 6 is a fragmentary side view partly in section of the center upright.
Figure 7:
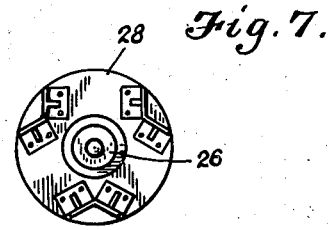
Figure 7 is a bottom plan view of the tripod head.
Figure 2:
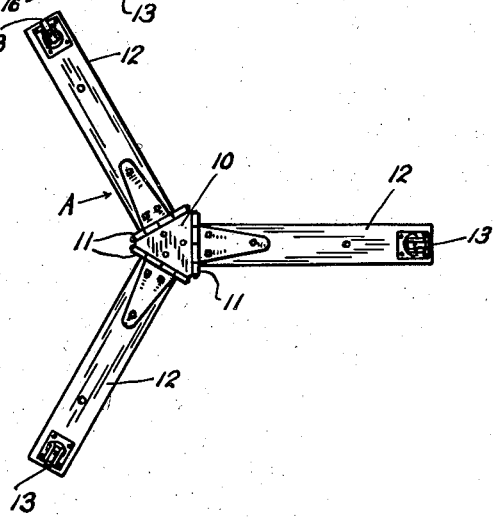
Figure 2 is a bottom plan view of the device.
Figure 3:
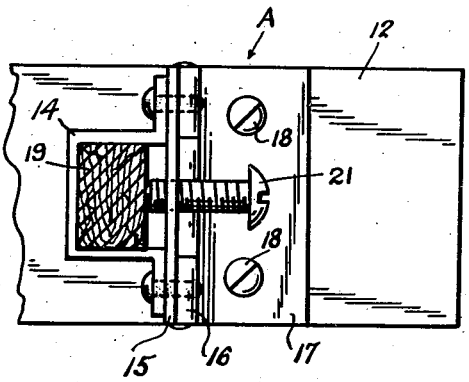
Figure 3 is a fragmentary sectional view taken on the line 3—3 of Figure 4 looking in the direction of the arrows.
Figure 4:
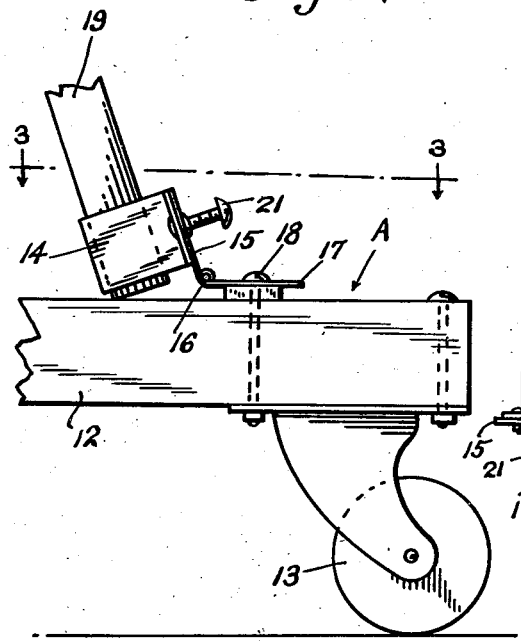
Figure 4 is a fragmentary side view of the structure shown in Figure 3.

Referring to the drawings in detail, the device constituting the present invention comprises a base designated generally at A, having a center flat faced substantially triangular shaped hub 10 fitted at its three outer edges angled to each other, the leaf hinges 11 to which are connected swingingly foldable and radially extendable arms 12. These arms 12 are of the same length with respect to each other and when extended spread laterally in a radial direction outwardly from the hub 10, which together create a base for a tripod B or a support C, respectively, or both the tripod and support.

Near the outer ends and at the under sides of the arms 12 are securely mounted swiveled roller casters 13 adapted for contact with a foundation when the base is spread so as to render it movable for maneuvering purposes on the foundation.

At the upper side of the arms 12 and next to their outer ends are swingable stirrups 14, each being fixed to a vertically movable leaf 15 of a double leaf hinge 16, the other leaf 17 of the latter being bolted at 18 to the arm 12 companion thereto. These stirrups 14 are adapted to receive the lowermost sections 19 of the sectional foldable and extensible legs 20 of the tripod 8 when the latter is superimposed on the base. Each stirrup 14 is fitted with a set screw 21 to lock the section 19 when engaged therein, so as to make fast the tripod upon the base of the device A. The swing of the stirrups 14 enables the proper adjustment thereof for accommodating the legs of the tripod.

Adapted to be placed on the base of the device A to be centered thereon is the support C which in this instance includes a centering post having the upper and lower telescopically interfitted extensible and contractible tube sections 22 and 23, respectively. The section 23 has arranged therewith the foldable radial spread feet 24, which in their spread condition are bolted at 25 to the upper sides of the arms 12 for fastening thereto to have the post rise centrally of the base in a vertical direction. The upper section 22 at its upper end through a coupling head 26 has separable countersunk fitting at 27 in the under side of the head or rest piece 28 of the tripod, this countersunk 27 being centrally of the said head or piece 28 to maintain the tripod vertically centered on the base and creates a fourth leg to the said tripod to retain it in a steady set up condition.

However, the post can be utilized for supporting a photograph lamp or other lighting equipment. When the device A is used to support a field engineering instrument, the post 23 will not necessarily be used, because the instrument will have its own specially made tripod which will rest directly upon the device.

Figure 5:
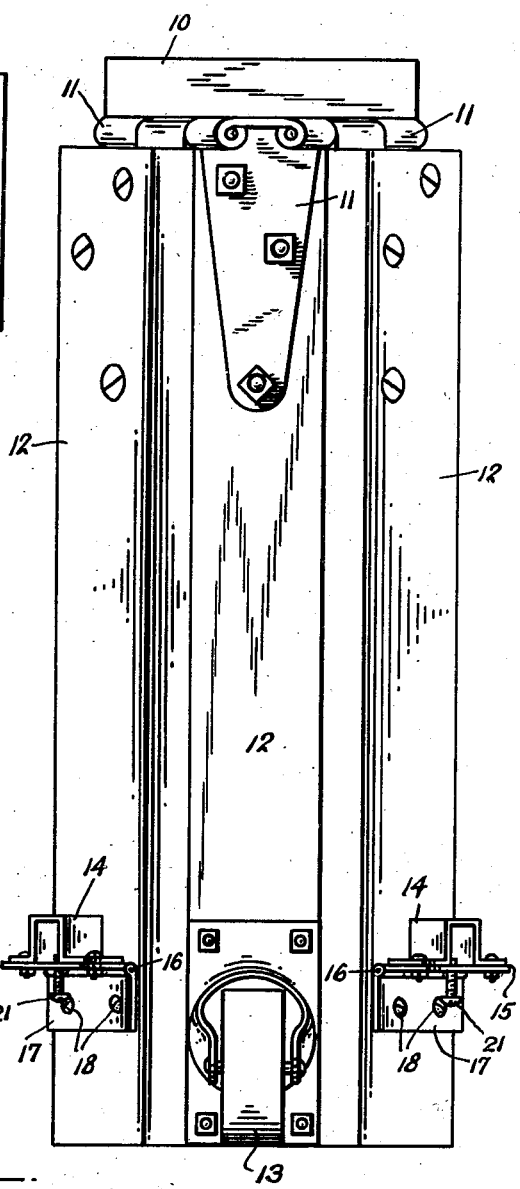
Figure 5 is an elevation of the device in folded condition.

When the tripod and the post have been detached from the base of the device A the latter can be readily folded as shown in Figure 5 of the drawings so as to occupy the least possible space when not in use or for the convenient transportation thereof.

The device is usable with either the tripod B or the support C, or both together. When the support C is used with the tripod it will allow the latter to carry a heavy load, and such tripod is primarily used for carrying a camera, either within a studio or for taking commercial photographs outside of the latter.

The hinges 16 are of the butt-type so that the arms 12 can swing only in one direction with respect to the hub 10, yet these arms can be maintained in the same plane with the hub when spread radially therefrom, this being the setup condition of the base of the device A for supporting the tripod or support B and C, respectively.

The tripod B is foldable in the usual manner, and the support C can be contracted and folded on detachment of these from the device A.

The device A enables the tripod B as well as the support C to be moved when in a setup condition on the base of such device, as well as permitting the easy adjustment of such tripod and support when on the base of the said device.

In the use of the device A it will prevent the legs of the tripod from sliding from under the camera, as well as offering safety and steadiness to the camera man in handling the camera. When the device A supports a photo flood-lamp or spotlight on the post there will be no chance of the same tilting over, even when the lamp or light is raised to the top of the post.

What is claimed is:

1. A device of the kind described, comprising a center hub, arms hinged to the hub and adapted to spread radially therefrom and also foldable with respect thereto, swiveled casters fitting the arms at their outer ends, and leg stirrups carried by the arms for receiving the legs of a tripod.

2. A device of the kind described, comprising a center hub, arms hinged to the hub and adapted to spread radially therefrom and also foldable with respect thereto, swiveled casters fitting the arms at their outer ends, leg stirrups carried by the arms for receiving the legs of a tripod, and means for locking the legs in the stirrups.

3. A device of the kind described, comprising a center hub, arms hinged to the hub and adapted to spread radially therefrom and also foldable with respect thereto, swiveled casters fitting the arms at their outer ends, leg stirrups carried by the arms for receiving the legs of a tripod, means for locking the legs in the stirrups, and a stand separably fitted upon the arms and forming a centering post for the tripod when stirruped thereon.

HENRY BRADY.